United States Patent [19]
Konuma et al.

[11] Patent Number: 5,255,122
[45] Date of Patent: Oct. 19, 1993

[54] PROJECTION LENS SYSTEM FOR PROJECTION TYPE TELEVISION

[75] Inventors: Nobuhiro Konuma; Takahiko Yoshida; Hiroki Yoshikawa; Masayuki Muranaka; Isao Yoshizaki, all of Kanagawa, Japan

[73] Assignee: Hitachi, Ltd., Tokyo, Japan

[21] Appl. No.: 626,554

[22] Filed: Dec. 12, 1990

[30] Foreign Application Priority Data

Dec. 13, 1989 [JP] Japan ................... 1-321424

[51] Int. Cl.$^5$ .......................... G02B 3/00; G02B 9/00
[52] U.S. Cl. .................................... 359/650; 359/648; 359/649
[58] Field of Search ................ 359/648, 649, 650, 651

[56] References Cited

U.S. PATENT DOCUMENTS

| | | | |
|---|---|---|---|
| 4,761,063 | 8/1988 | Yoshioka et al. | 359/649 |
| 4,792,217 | 12/1988 | Yoshioka | 359/649 |
| 4,948,237 | 8/1990 | Hirata et al. | 359/649 |
| 4,987,483 | 1/1991 | Tsukagoshi | 359/589 |

FOREIGN PATENT DOCUMENTS

| | | |
|---|---|---|
| 57-16414 | 1/1982 | Japan . |
| 59-112545 | 6/1984 | Japan . |
| 61-121583 | 6/1986 | Japan . |
| 62-262819 | 11/1987 | Japan . |
| 63-65401 | 3/1988 | Japan . |
| 2-190810 | 7/1990 | Japan ................... 359/649 |

Primary Examiner—Bruce Y. Arnold
Assistant Examiner—Hung X. Dang
Attorney, Agent, or Firm—Antonelli, Terry, Stout & Kraus

[57] ABSTRACT

A projection lens system for a projection type television having a cathode-ray tube with a panel having a fluorescent inner surface for projecting an image onto a screen. The projection lens system includes a plurality of lens groups, the lens group positioned at a side nearest to the cathode-ray tube including, in successive order from a side toward the screen, a lens having a concave surface on the screenn side a transparent medium, and the cathode-ray tube panel having a fluorescent inner surface, the lens group attenuating at least a part of a wavelength region of the light emitted on the fluorescent surface so as to improve contrast while reducing observance of a ghost image due to multiple reflection without substantial impairment in at least one of brightness and luminance. More particularly, the attenuation is provided by the concave lens having at least one surface dyed in a predetermined color.

24 Claims, 5 Drawing Sheets

PROJECTION LENS SYSTEM FOR PROJECTION TYPE TELEVISION

BACKGROUND OF THE INVENTION

The present invention relates to a projection lens system suitable for an optical system in a projection type television in which a projection image superior in contrast is obtained.

Figure 6A:
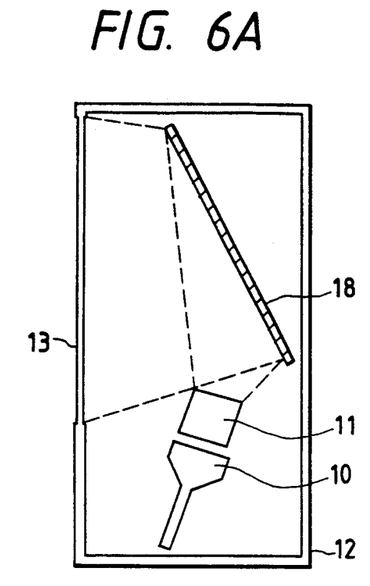
FIGS. 6A and 6B are side and front schematic partial sectional views of a projection type television.
Figure 6B:
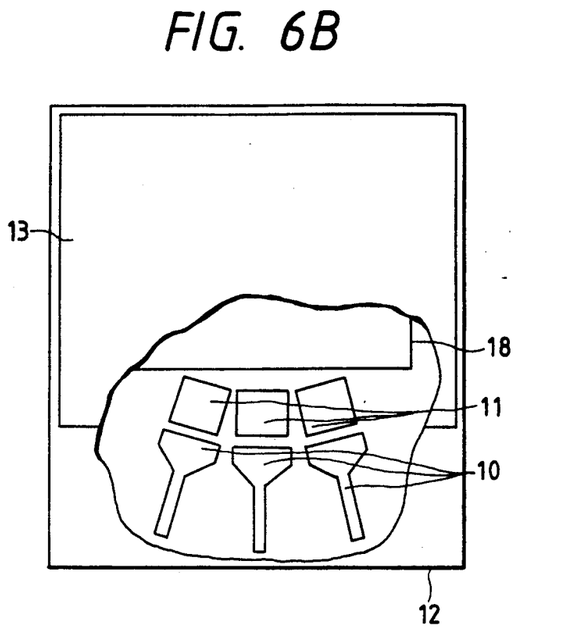
Figure 7:
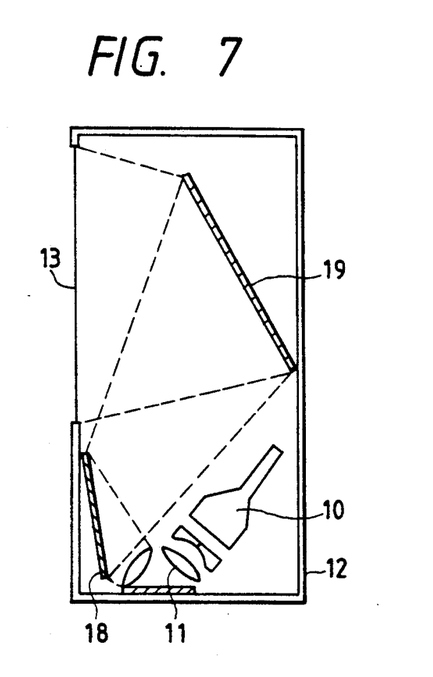
FIG. 7 is a side schematic partial sectional view of another projection type television.

A projection type television is constituted in such a manner that images on fluorescent faces of three monochromatic projection type cathode-ray tubes which emit, for example, red, green and blue, respectively, are enlarged by projection lenses provided in front of the cathode-ray tubes, then projected onto a screen and combined together on the screen to obtain a color image. FIGS. 6 and 7 each show a general arrangement example of optical parts of a projection type television. In these figures, the reference numerals 10, 11, 12 and 13 denote a projection type cathode-ray tube, a projection lens, a housing and a screen, respectively, and numerals 18 and 19 represent turn-back or reflecting mirrors. In the case of using a lens system with a long projection distance, two turnback or reflecting mirrors 18 and 19 disposed so as to reduce the entire size, as shown in FIG. 7, while in the case of a lens system with a short projection distance, it is sufficient to use only one mirror 18, as shown in FIGS. 6A and 6B. Since a mirror may cause deterioration of focus and contrast, development of projection lenses having a short projection distance, a reduced aberration and a good focusing characteristic has been conducted as described, for example, in Japanese Patent Laid Open Nos. 200215/85, 200216/85, 71915/87 and 174711/87.

The above conventional projection lenses have a short projection distance and have a good focusing characteristic, but have not always been satisfactory with respect to contrast on the projection screen. In view of this point, that is, for improving the contrast, the Japanese Patent Laid Open No. 174711/87 (corresponding to U.S. Pat. No. 4,884,879) referred to above proposes a technique whereby the space between an outer surface of a cathode-ray tube panel having a fluorescent inner surface and a concave lens positioned on a screen side away from the outer surface of the CRT panel is filled with a medium having a refractive index close to that of the concave lens or the panel glass to diminish the reflection on the panel-side interface of the concave lens, thereby improving the contrast. In this conventional technique, however, no consideration is given to the light reflected on the screen-side interface of the concave lens in contact with air, and the reflected light from the interface to the panel side is not removed thoroughly.

Figure 8A:
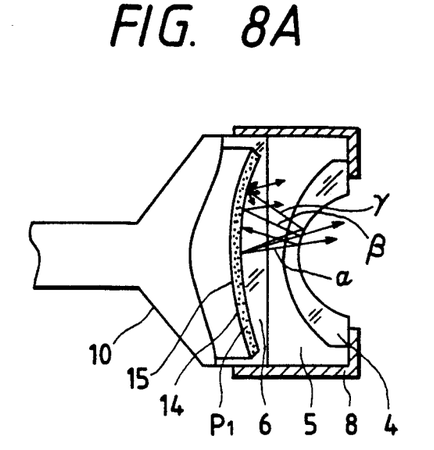
FIGS. 8A, 8B and 9A, 9B are views for explaining the production of a ghost image caused by reflection on a screen-side interface of a concave lens which is combined with a CRT fluorescent face panel to constitute a single lens group.

This problem will now be explained in more detail with reference to FIGS. 8 and 9 each illustrating a positional relation among a cathode-ray tube, the above concave lens as a part of a projection lens system and a medium. In FIGS. 8A and 9A, the numeral 10 denotes a cathode-ray tube; numeral 6 denotes a panel of the CRT 10; numeral 14 denotes a phosphor applied to the inner surface of the panel; numeral 15 denotes a metal back film formed of aluminum by vapor deposition on the inside of the phosphor; numeral 4 denotes a concave lens constituting the projection lens system and positioned nearest to the cathode-ray tube; and numeral 8 denotes a bracket for the connection of the concave lens 4 and the cathode-ray tube 10 and also for the sealing of a medium (functioning also as coolant) between the concave lens and the panel. The portion comprising the phosphor layer formed on the inner surface of the panel and the metal back film is normally called a fluorescent face $P_1$. FIGS. 8B and 9B are each a view in which a ghost image induced by the reflected light on the air-side interface of the concave lens 4 is seen on the screen when a luminous point is formed on the fluorescent face of the panel 6.

Figure 8B:
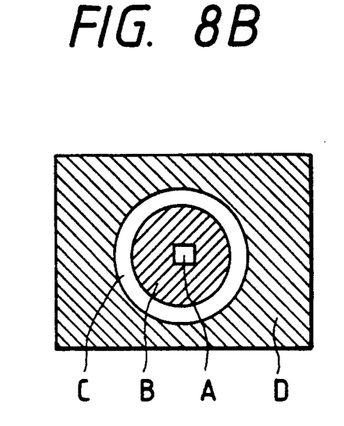
Figure 9A:
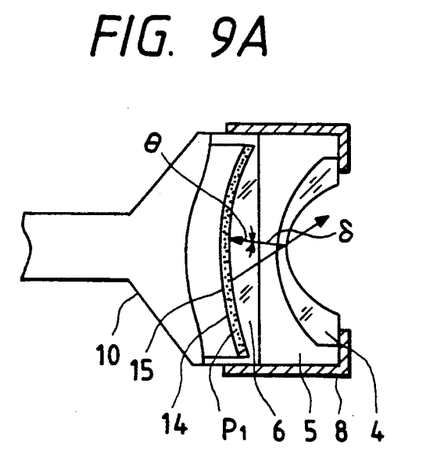
Figure 9B:
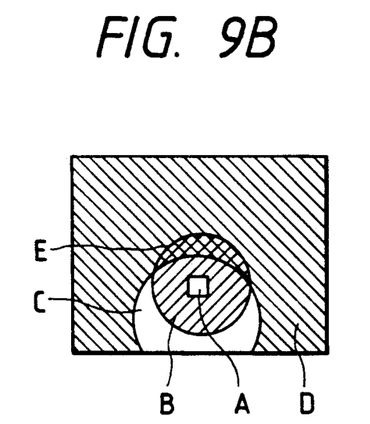

FIG. 8B shows a state in which a luminous point A is positioned at the center of the fluorescent face $P_1$. As shown in FIG. 8A, light rays $\alpha$ travelling gradually toward the center of the lens pupil (not shown) are partially reflected by the air-side interface of the concave lens 4 and return to the panel 6. This reflected light passes through the phosphor 1 and is again reflected by the metal back film 15, then appears on the screen as if the phosphor 14 were luminous as represented by portion B in FIG. 8B.

Further, light rays $\beta$, as shown in FIG. 8A, travelling still more outside the light rays $\alpha$ are partially reflected by the air-side interface of the concave lens 4 and return to the panel 6 like the light rays $\alpha$, but do not return to the phosphor 14 due to total reflection on the fluorescent face $P_1$. Consequently, there appears a ring-like black band represented by C in FIG. 8B.

Additionally, light rays $\gamma$, as shown in FIG. 8A, travelling further outside the light rays $\beta$ return to the panel 6 after total reflection on the air-side interface of the concave lens 4. This reflected light, like the reflected light of the light rays $\beta$, is totally reflected by the fluorescent face $P_1$ of the panel 6, but since the intensity thereof is very strong as compared with the reflected light of the light rays $\beta$, it is impossible to ignore a component of irregular reflection on concave and convex portions of the fluorescent face $P_1$ (the fluorescent face $P_1$ is an uneven or rough surface due to the application of the phosphor thereto), which component appears as a ghost image on the screen, as represented by D in FIG. 8B.

Now, FIGS. 9A and 9B will be described with respect to a case where a luminous point A is in an off-center position on the fluorescent face $P_1$. A basic phenomenon is the same as that in the case where a luminous point is centrally positioned, but in the case of total reflection on the air-side interface of the concave lens 4, light rays $\beta$ reflected near the center of the concave lens are incident on the fluorescent face $P_1$, of the panel 6 at a small angle $\theta$, so total reflection thereof does not occur on the fluorescent face $P_1$. Consequently, as represented by E in FIG. 9B, a very bright, crescent-shaped ghost image is developed in an overlapped position of the ghost images B and D. The higher the contrast performance of a television set, the more conspicuous this ghost image becomes, resulting in degradation of the picture plane.

The reflection on the air-side interface of the concave lens is about 4%, which reflection can be reduced by forming a multi-layered film anti-reflection coating on the air-side of the concave lens. However, in the case where the concave lens is formed of an optical resin, it is impossible to form such multilayered film anti-reflection coating. More particularly, the concave lens faces a high-temperature coolant and thus the environment thereof is very restricted. The temperature range is from $-20°$ to $+80°$ C. On the other hand, the expansion coefficient of the optical resin is fairly large as compared with that of the coating material. Due to such a great difference in expansion coefficient, there occurs a breakage of the film as the temperature changes. Particularly, when the number of coating layers is large and the entire thickness of the multi-layer film is large, the contraction and expansion properties of the film are deteriorated and film breakage is apt to occur. Therefore, a coating of only coating of a single-layer film and properly be effected and in this case the reflection is 1 to 2%. Accordingly, a multi-layered anti-reflection coating cannot be formed on the concave lens and so far it has been impossible to fully eliminate the reflected light returning to the fluorescent face from the air-side interface of the concave lens.

The above-described construction intends to eliminate the source of the reflected light itself. On the other hand, there has also been proposed a construction wherein an optical element which absorbs the reflected light is provided between the fluorescent face and the air-side interface of the concave lens. For example, in Japanese Patent Laid Open No. 254890/85 there is disclosed a technique wherein a having a light absorbing wall is provided in a lower cathode-ray tube and the reflected light from the air-side interface of the concave lens is absorbed by the light absorbing wall to improve the contrast. However, such construction presents a problem with respect to brightness because an oblique exit light from the cathode-ray tube is wholly absorbed by the light absorbing wall. Additionally, the number of parts is increased because it is necessary to provide a louver as an optical element having a light absorbing wall and this also presents a problem.

SUMMARY OF THE INVENTION

It is an object of the present invention to provide a projection lens system for a projection type television which has improved contrast performance.

It is another object of the present invention to provide a projection lens system for a projection type television which is superior in contrast performance, has high brightness, does not require an extra component, and reduces the amount of light reflected from an air-side interface of a concave lens and returned to the fluorescent face which causes deterioration of the contrast on the fluorescent face.

It is a further object of the present invention to provide a projection lens system for a projection type television enabling attenuation of at least a part of a wavelength region of light emitted on the fluorescent surface of a cathode-ray tube so as to improve contrast while reducing observance of a ghost image due to multiple reflection without substantial impairment of brightness or luminance.

According to the present invention, in order to achieve the above-mentioned objects, there is provided a projection lens system for a projection type television, comprising a plurality of lens groups, a lens group located on the nearest side to a cathode-ray tube being constituted by, successively from a screen side, a lens having a concave surface on the screen side, a transparent medium and a cathode-ray tube bulb panel having a fluorescent inner surface, the lens having a concave surface being dyed in a color having a characteristic of absorbing at least a part of a wavelength region of light emitted on the fluorescent surface.

In accordance with the present invention, light reflected by the air-side interface of the concave lens reaches the fluorescent face of the cathode-ray tube through the concave lens. In this case, if the concave lens is dyed in a color having a characteristic of absorbing at least a part of a wavelength region of light emitted on the fluorescent face, the reflected light is partially absorbed by the dyed concave lens, so that the illumination intensity of the reflected light on the fluorescent face lowers. If the reflectivity of the air-side interface of the concave lens is R and the transmissivity of the dyed layer of the same lens is T, the transmissivity of air-side interface of the lens is 1-R, and a ghost-free projection image light component undergoes attenuation once through the dyed layer and also undergoes attenuation once through the air-side interface, so it is proportional to T(1-R). On the other hand, a ghost image component undergoes attenuation three times through the dyed layer, also undergoes reflection once through the air-side interface and attenuation once through the same interface, so it is proportional to $T^3R(1-R)$. Since the contrast corresponds to the ratio of the ghost-free image light component to the ghost image component, it is proportional to $1/T^2R$. Thus, it is seen that the contrast is improved in inverse proportion to the square of the transmissivity of the dyed layer. Consequently, it is possible to obtain an image superior in contrast performance with a ghost image being substantially inconspicuous.

In the present invention, since the concave lens is a component already provided in the lens group, an extra component is not necessary. Further, unlike the light absorbing wall of the louver, merely a part of the exit light from the cathode-ray tube is absorbed, so there is substantially no lowering of brightness or luminance.

These and other objects, features, and advantages of the present invention will become more obvious from the following description when taken in connection with the accompanying drawings which show, for purposes of illustration, several embodiments in accordance with the present invention.

DETAILED DESCRIPTION OF THE DRAWINGS

DETAILED DESCRIPTION OF THE PREFERRED EMBODIMENTS

Before referring to the drawings illustrating the present invention, it should be noted that the present invention is described in terms of a concave lens which is dyed and the reason why the concave lens is dyed rather than some component will be stated below since it will appear that the same effect should be obtained even when the panel or the coolant is dyed.

First, dyeing of the panel of the cathode-ray tube will be considered. Since the panel is made of glass, it is difficult to dye the surface thereof and hence it is necessary to obtain the panel by molding a colored glass. In this case, however, a problem is encountered with respect to universal usage. Next, when a dye is dissolved in a medium which is the coolant, dyeing is made easy, but the dye components in the coolant may react with the bracket material which is aluminum so as to cause a deposit of an opaque compound. Additionally, in the case where the medium-side face of the concave lens is in the shape of a spherical face having a small radius of curvature, there occurs a difference in the degree of light absorption because the thickness of the medium at the center and that at the peripheral portion are different from each other, resulting in a problem of unevenness in luminance or in color.

On the other hand, there are no such problems in the case of dyeing of the concave lens. In the case where the concave lens is made of a synthetic resin, it can be dyed easily. Not only when the concave lens is dyed by surface dyeing, but also when the entirety of the concave lens is dyed by molding an optical resin with a dye dispersed therein, there does not occur unevenness in luminance or in color because there is little difference in the lens thickness between the central and peripheral portions thereof. Thus, it is the best to apply a reflected light absorbing dye to the concave lens. It is noted that Japanese Patent Laid Open No. 16414/82 discloses a plastic lens which focuses light rays from a fluorescent face of a specific emitted light color onto a screen combined with an optical filter which exhibits a high transmissivity only for the emitted light wavelength of such specific color for projection type television. However, this construction serves to compensate for the difficulty in chromatic aberration correction of the plastic lens and is not directed to improvement in contrast and/or reduction of observance of a ghost image as is provided by the present invention.

Figure 1:
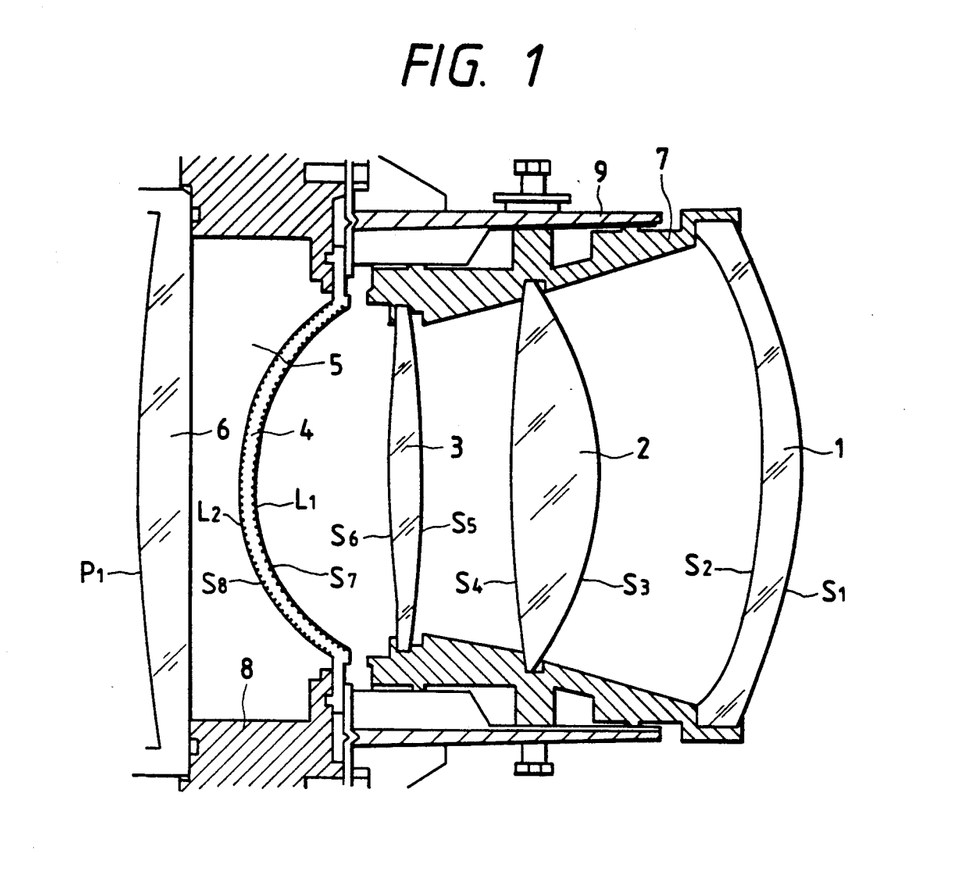
FIG. 1 is a sectional view showing a portion of a projection lens system according to a first embodiment of the present invention.

Referring now to the drawings, FIG. 1 is a sectional view showing a portion of a projection lens system according to a first embodiment of the present invention wherein the cathode-ray tube has a panel 6 with a fluorescent inner surface or face $P_1$. A coolant 5 as a transparent medium such as a liquid is interposed between the panel 6 and a concave lens 4 serving as a constituent of a fourth lens group. Reference numerals 3, 2 and 1 denote third, second and first lens groups, respectively. The panel 6 and concave lens 4 are connected by way of the bracket 8 while brackets 7 and 9 serve for positioning and connection of the lens groups.

Figure 2:
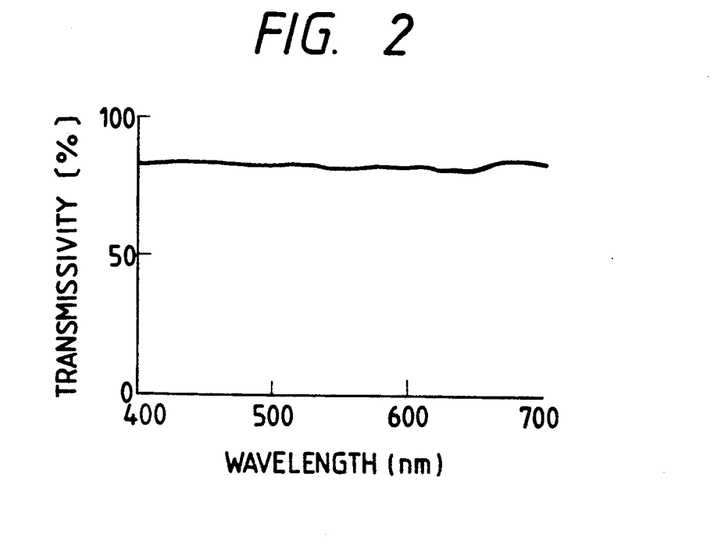
FIG. 2 is a view showing a spectral transmissivity of a concave lens dyed in gray used in the first embodiment.

On an air-side face $S_7$ and a medium-side face $S_8$ Of the concave lens 4 there are formed gray dyed layers $L_1$ and $L_2$, respectively. FIG. 2 shows a spectral transmissivity of the concave lens 4 (the fourth lens group) which is dyed in gray. The light reflected on the air-side face $S_7$ of the concave lens 4 is again absorbed by the dyed layers $L_1$ and $L_2$ of the concave lens 4, so that the illumination intensity of the said reflected light on the fluorescent face $P_1$ of the panel 6 becomes lower. If the reflectivity of the air-side interface $S_7$ Of the concave lens 4 is R and the transmissivity of the dyed layers $L_1$, $L_2$ of the same lens is T, the transmissivity of the air-side interface $S_7$ Of the lens 4 is 1-R. Since a ghost-free image light component undergoes attenuation once through the dyed layers $L_1$ and $L_2$ and also undergoes attenuation once through the air-side interface $S_7$, it is proportional to T(1-R). On the other hand, the ghost image component is proportional to $T^3R(1-R)$ because it undergoes attenuation three times; through the dyed layers $L_1$, $L_2$, reflection once on the air-side interface $S_7$ and attenuation once through the air-side interface $S_7$. The contrast is proportional to $1/T^2R$ because it is the ratio of the ghost-free image light component to the ghost image component. That is, the contrast is improved in inverse proportion to the square of the transmissivity of the dyed layers $L_1$ and $L_2$ For example, if a combined attenuation of the dyed layers $L_1$, and $L_2$ is 20%, the transmissivity of the dyed layers $L_1$ and $L_2$ is $T=0.8$ and thus the contrast is improved to $1/T^2=1.6\times$. Thus, there can be obtained an image superior in contrast performance with the ghost image being substantially inconspicuous. More particularly, the dyed surfaces of the concave lens 4 serve for attenuating at least a part of a wavelength region of light emitted on the fluorescent face $P_1$ of the panel 6 of the cathode-ray tube so as to improve contrast while reducing observance of a ghost image due to multiple reflection without substantial impairment in brightness or luminance.

Figure 3:
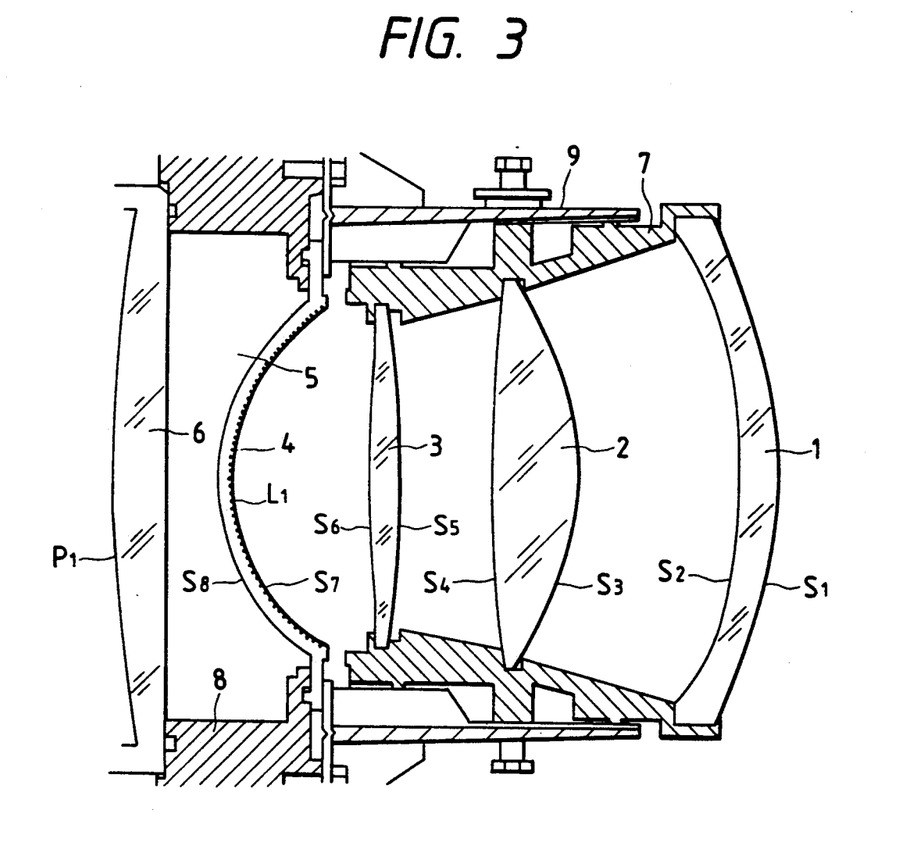
FIG. 3 is a sectional view of a portion of a projection lens system according to a second embodiment of the present invention.

Although in the above embodiment both sides, i.e., the air-side face $S_7$ and the medium-side face $S_8$ of the concave lens 4 are dyed, this does not constitute any limitation, and FIG. 3 is a sectional view showing a portion of a projection lens system according to a second embodiment of the present invention wherein only one side, particularly only the air-side face $S_7$, of the concave lens 4 is dyed and the medium-side face $S_8$ is not dyed. There are dyes which dissolve into the coolant 5, but this embodiment permits the use of such dyes because the dyed layer $L_1$ is formed only on the air-side face $S_7$, and thus the selection range for dyes having a predetermined spectral transmissivity becomes wider. In other words, no matter what dye is used, there is no fear of the dye in the dyed layer $L_1$ dissolving out into the coolant 5.

In the above surface dyeing, good results were obtained when there were used (Terasil Brilliant Blue) BGE200%, a product of CIBA-GEIGY (Japan) Limited; (Dianix Turquoise Blue) B-FS, a product of Mitsubishi Chemical Industries Ltd.; (Sumikaron Brilliant Blue) S-BL, a product of Sumitomo Chemical Co., Ltd.; and (Palanil Brilliant Blue) BG-CF, a product of BASF Japan.

Figure 4:
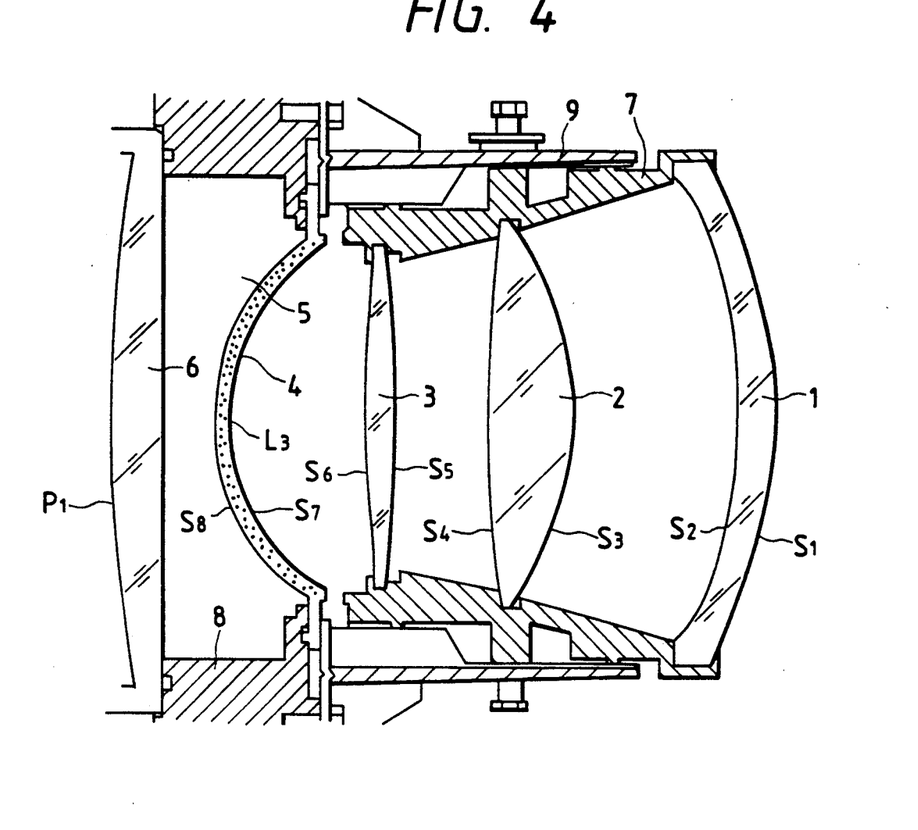
FIG. 4 is a sectional view of a portion of a projection lens system according to a third embodiment of the present invention.

FIG. 4 is a sectional view showing a portion of a projection lens system according to a third embodiment of the present invention. In this embodiment, the concave lens 4 is formed by molding of an optical resin in which is dispersed a dye, e.g.,Macrolex Green, a product of Bayer Japan, and the whole entirety $L_3$, of the lens is dyed. There is no problem of unevenness in color because there is little difference in the thickness of the concave lens 4 between the central portion and the peripheral portion of the same lens. Further, since the entirety $L_3$ of the lens is dyed, no matter what dye is used, again there is no fear of the dye in the dyed layer L₁, dissolving out into the coolant 5.

Although dyes are generally used for dyeing, it is noted that pigments may also be used. Further, although gray was described above any color may be used if only it has a characteristic of absorbing light of at least a part of the wavelength region of light emitted on the fluorescent face P₁.

Figure 5:
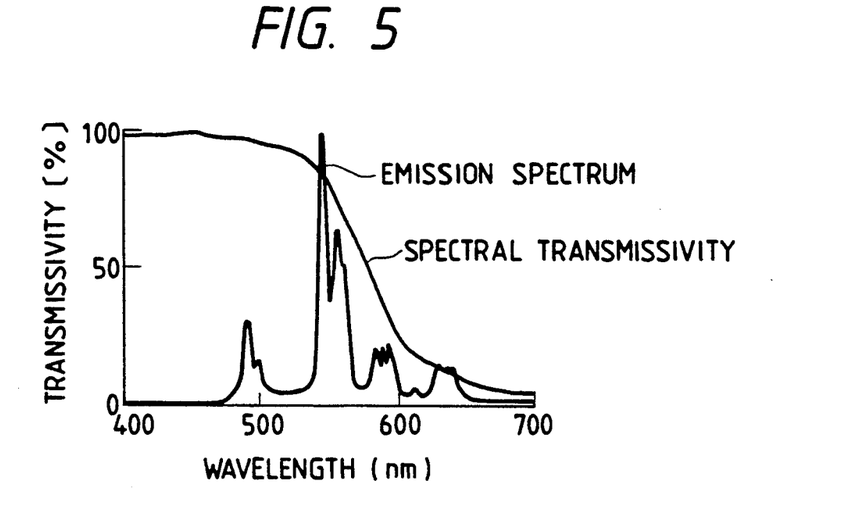
FIG. 5 is a view showing an emission spectrum of a green phosphor in a projection lens system according to a fourth embodiment of the present invention and also showing a spectral transmissivity of a blue or green dyed concave lens used in the fourth embodiment.

FIG. 5 shows an emission spectrum of a green phosphor in a projection lens system combined with the panel of a green projection type cathode-ray tube according to a fourth embodiment of the present invention and also shows a spectral transmissivity of a concave lens 4 dyed in blue or green and used in the projection lens system. The emission spectrum of a green phosphor contains such unnecessary spurious components as 450 nm (blue), 590 nm (yellow) and 610 nm (red) in addition to a main wavelength component of 545 nm.

The blue and red spurious components contained in the emission spectrum of the green phosphor can be taken case of by blue and red projection type cathode-ray tubes, respectively. In the case of a green projection tube, therefore, by attenuating the blue and red spurious components relative to the main wavelength of green color, it is possible to attain a great improvement of contrast without impairing the brightness of the green color. According to this embodiment there can be attained not only the improvement of contrast, but also the improvement of color purity.

Although in the above embodiment the dye color is blue or green, any color may be used if only it has a characteristic of absorbing a larger amount of light of a wavelength region other than the main wavelength region of the light emitted by the phosphor.

Further, by using the projection lens system of the present invention, the reflected light returning to the panel side from the screen-side interface of the concave lens which is combined with a cathode-ray tube panel to constitute a single lens group or a single lens, is greatly diminished as compared with the conventional projection lens systems and the contrast is improved to a remarkable extent. Therefore, by constituting a projection type television using such projection lens system of the present invention, there can be attained an extremely good contrast, a high color purity and a bright projection image.

According to the present invention, the concave lens which is combined with a fluorescent face panel to constitute a single lens and which is located near the screen, in the projection lens system of the invention, is dyed in a color having a characteristic of absorbing at least a part of the wavelength region of light emitted on the fluorescent face, the light reflected on the air-side interface of the concave lens is again absorbed by the same lens, so that the illumination intensity of the reflected light on the CRT fluorescent face becomes lower and hence there can be obtained an image superior in contrast performance with a ghost image being substantially inconspicuous.

While we have shown and described several embodiments in accordance with the present invention, it is understood that the same is not limited thereto but also is susceptible of numerous changes and modifications as known to those skilled in the art and we therefore do not wish to be limited to the details shown and described herein but intend to cover all such changes and modifications as are encompassed by the scope of the appended claims.

What is claimed is:

1. A projection lens system for a projection type television having a cathode-ray tube with a panel having a fluorescent inner surface for projecting an image onto a screen, the projection lens system comprising a plurality of lens groups, one of the lens groups positioned at a side nearest to the cathode ray tube including, in successive order from a side toward the screen, a lens having a concave surface on the screen side, a transparent medium, and the cathode-ray tube panel having a fluorescent inner surface, the one of the lens groups including means for absorbing at least a part of a wavelength region of the light emitted on the fluorescent surface so as to improve contrast while reducing observance of a ghost image due to multiple reflection.

2. A projection lens system according to claim 1, wherein the plurality of lens groups includes four lens groups, the four lens groups including in successive order from the screen toward the cathode-ray tube, a first lens group, a second lend group, a third lens group, and a fourth lens group, the fourth lens group including the absorbing means.

3. A projection lens system according to claim 2, wherein the fourth lens group only includes a single lens.

4. A projection lens system according to claim 3, wherein the transparent medium is a liquid, and the absorbing means includes the concave lens having at least one surface dyed in a predetermined color.

5. A projection lens system according to claim 3, wherein the concave lens has a first surface in contact with the liquid transparent medium and a second surface in contact with air, at least the second surface in contact with air being dyed in the predetermined color.

6. A projection lens system according to claim 5, wherein the predetermined color has a characteristic of absorbing a larger amount of light in a wavelength region other than a principle wavelength region of light emitted on the fluorescent surface.

7. A projection lens system according to claim 1, wherein the absorbing means enables improvement of contrast and reduction of observance of a ghost image without substantial impairment in at least one of brightness and luminance.

8. A projection lens system for a projection type television having a cathode-ray tube with a panel having a fluorescent inner surface for projecting an image onto a screen, the projection lens system comprising a plurality of lens groups, one of the lens groups positioned at a side nearest to the cathode ray tube including, in successive order from a side toward the screen, a lens having a concave surface on the screen side, a transparent medium, and the cathode-ray tube panel having a fluorescent inner surface, the one of the lens groups including means for attenuating at least a part of a wavelength region of the light emitted on the fluorescent surface so as to improve contrast while reducing observance of a ghost image due to multiple reflection, wherein the projection lens system is for a color projection type television and the attenuating means includes the concave lens having at least one surface dyed in a predetermined color.

9. A projection lens system according to claim 8, wherein the at least one surface of the concave lens is dyed in the predetermined color having a characteristic of absorbing a larger amount of light in a wavelength region other than a principle wavelength of light emitted on the fluorescent surface.

10. A projection lens system according to claim 8, wherein the concave lens has a first surface in contact with the transparent medium and another surface in contact with air, at least the second surface in contact with air being dyed in the predetermined color.

11. A projection lens according to claim 10, wherein only the second surface of the concave lens is dyed in the predetermined color.

12. A projection lens system according to claim 10, wherein the first surface of the concave lens in contact with the transparent medium is also dyed in the predetermined color.

13. A projection lens system according to claim 12, wherein the predetermined color has a characteristic of absorbing a larger amount of light in a wavelength region other than a principle wavelength region of light emitted the fluorescent surface.

14. A projection lens system according to claim 10, wherein the predetermined color has a characteristic of absorbing a larger amount of light in a wavelength region other than a principle wavelength region of light emitted on the fluorescent surface.

15. A projection lens system for a projection type television having a cathode-ray tube with a panel having a fluorescent inner surface for projecting an image onto a screen, the projection lens system comprising a plurality of lens groups, one of the lens groups positioned at a side nearest to the cathode ray tube including, in successive order from a side toward the screen, a lens having a concave surface on the screen side, a transparent medium, and the cathode-ray tube panel having a fluorescent inner surface, the one of the lens groups including means for attenuating at least a part of a wavelength region of the light emitted on the fluorescent surface so as to improve contrast while reducing observance of a ghost image due to multiple reflection, wherein the concave lens is a molded optical resin concave lens having a dye of a predetermined color dispersed therein.

16. A projection lens system according to claim 15, wherein the predetermined color has a characteristic of absorbing a larger amount of light in a wavelength region other than a principle wavelength region of light emitted on the fluorescent surface.

17. A projection lens system for a projection type television having a cathode-ray tube for projecting an image onto a screen, the projection lens system comprising a plurality of lenses disposed between the cathode-ray tube and the screen, and means for reducing observance of a ghost image including means for absorbing at least a portion of a wavelength region of light emitted from the cathode-ray tube.

18. A projection lens system according to claim 17, wherein the means for reducing observance of a ghost image is provided within at least one lens of the plurality of lenses.

19. A projection lens system according to claim 18, wherein the means for reducing observance of a ghost image includes a light absorbing material disposed at least partially within the at least one lens.

20. A projection lens system according to claim 19, wherein the light absorbing material is an absorptive color filter material disposed substantially throughout the at least one lens.

21. A projection lens system according to claim 20, wherein the at least one lens having the absorptive color filter material disposed therein is of substantially uniform thickness.

22. A projection lens system according to claim 21, wherein the at least one lens of substantially uniform thickness is a concave lens having a concave surface on the screen side and disposed adjacent to the cathode-ray tube and spaced from the cathode-ray tube by a transparent medium.

23. A projection lens system according to claim 22, wherein the cathode-ray tube has a panel with a fluorescent curved inner surface, the panel having a substantially flat outer surface and a greater thickness at a center portion than at a peripheral portion thereof.

24. A projection lens system for a projection type television having a cathode-ray tube for projecting an image onto a screen, the projection lens system comprising a plurality of lenses disposed between the cathode-ray tube and the screen, at least one lens of the plurality of lenses including therein means for absorbing at least a portion of a wavelength region of light emitted from the cathode-ray tube, the cathode-ray tube having a panel with a fluorescent curved inner surface, the panel having a substantially flat outer surface and a greater thickness at a center portion than at a peripheral portion thereof.

* * * * *